United States Patent
Lin et al.

(10) Patent No.: US 9,479,046 B2
(45) Date of Patent: Oct. 25, 2016

(54) MULTI-MODE PFC CONTROL AND CONTROL METHOD THEREOF

(71) Applicant: Chengdu Monolithic Power Systems Co., Ltd., Chengdu (CN)

(72) Inventors: Sicong Lin, Hangzhou (CN); Yiqing Jin, Hangzhou (CN); Yuancheng Ren, Hangzhou (CN); Junming Zhang, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 8 days.

(21) Appl. No.: 14/222,451

(22) Filed: Mar. 21, 2014

(65) Prior Publication Data
US 2014/0285163 A1    Sep. 25, 2014

(30) Foreign Application Priority Data

Mar. 21, 2013 (CN) .......................... 2013 1 0091524

(51) Int. Cl.
*H02M 1/42* (2007.01)
*H02M 1/40* (2007.01)

(52) U.S. Cl.
CPC ............. *H02M 1/4225* (2013.01); *H02M 1/40* (2013.01); *H02M 1/42* (2013.01); *Y02B 70/126* (2013.01)

(58) Field of Classification Search
CPC ... H02M 1/42; H02M 1/4208; H02M 1/4225
USPC ....................................... 323/205, 208, 285
See application file for complete search history.

(56) References Cited

U.S. PATENT DOCUMENTS

| | | | |
|---|---|---|---|
| 7,538,534 B2* | 5/2009 | Mednik et al. | 323/285 |
| 7,923,973 B2* | 4/2011 | Odell | 323/207 |
| 2004/0263140 A1* | 12/2004 | Adragna | G05F 1/70 323/282 |
| 2005/0258814 A1* | 11/2005 | Chen | H02M 3/1588 323/285 |
| 2012/0014148 A1* | 1/2012 | Li et al. | 363/78 |
| 2012/0139505 A1 | 6/2012 | Ren | |
| 2012/0170335 A1* | 7/2012 | Lee et al. | 363/89 |
| 2012/0274301 A1* | 11/2012 | Nakashima | 323/284 |
| 2012/0290145 A1* | 11/2012 | Joshi et al. | 700/298 |
| 2012/0293141 A1 | 11/2012 | Zhang | |
| 2014/0097808 A1* | 4/2014 | Clark | G05F 1/70 323/208 |

FOREIGN PATENT DOCUMENTS

CN    102710118 A    10/2012
CN    103066817 A    4/2013

* cited by examiner

*Primary Examiner* — Matthew Nguyen
*Assistant Examiner* — Trinh Dang

(57) ABSTRACT

A PFC circuit includes: a switching circuit having a power switch; an on time control circuit for controlling an on time period of the power switch; a first off time control circuit; a second off time control circuit; and a logic circuit selectively controls the power switch working under CCM or DCM; when working under CCM, the first off time control circuit controls an off time period of the power switch and when working under DCM, the second off time control circuit controls the off time period of the power switch.

20 Claims, 13 Drawing Sheets

MULTI-MODE PFC CONTROL AND CONTROL METHOD THEREOF

CROSS-REFERENCE TO RELATED APPLICATION

This application claims the benefit of CN application No. 201310091524.1, filed on Mar. 21, 2013, and incorporated herein by reference.

TECHNICAL FIELD

The present invention generally relates to electrical circuit, and more particularly but not exclusively relates to power factor correction circuit and associated control circuit and control method.

BACKGROUND

Power Factor Correction (PFC) circuits are widely used in power converters in order to correct the current phase and improve the power factor. FIG. 1 illustrates a waveform diagram in a PFC control. An input voltage Vin is a half-sine waveform signal, and is usually rectified from a commercial power which is an Alternating-Current (AC) sine wave. In order to implement PFC control, the waveform shape of an input current Iin needs to follow the waveform shape of its input voltage Vin, and the phase of input current Iin is the same with that of input voltage Vin. As shown, a relatively high input voltage Vin corresponds to a relatively low average input current Iin_avg. In a switching mode PFC circuit, the waveform shape of input current Iin has a saw tooth shape, and power factor can be improved by controlling the waveform shape of average input current Iin_avg of input current Iin to follow the waveform shape of input voltage Vout, and thus PFC control is fulfilled.

At the meantime, the international energy agency puts forward high requirements in power conversion efficiency of PFC circuit. However, light load efficiency of the present PFC products could not meet the requirements well.

Accordingly, an improved PFC circuit with high efficiency, especially the light load efficiency is required to at least address one or some of the above deficiencies.

SUMMARY

In one embodiment, a PFC circuit comprises: a switching circuit comprising a power switch, the switching circuit having an input terminal configured to receive an input voltage and have an input current, the switching circuit further having an output terminal configured to provide an output voltage for supplying a load; an on time control circuit configured to provide an on time control signal for controlling an on time period of the power switch; a first off time control circuit configured to provide a first off time control signal; a second off time control circuit configured to provide a second off time control signal; and a logic circuit configured to selectively control the power switch working under Continuous Conduction Mode (CCM) or Discontinuous Conduction Mode (DCM) based on a load condition of the load, and wherein the logic circuit is configured to receive the on time control signal, the first off time control signal and the second off time control signal and to generate a switching control signal that is coupled to the power switch; wherein the first off time control signal is configured to control an off time period of the power switch under CCM; and the second off time control signal is configured to control the off time period of the power switch under DCM.

In another embodiment, a PFC control circuit for controlling a power switch coupled between an input terminal and an output terminal, wherein the input terminal has an input voltage and has an input current flowing into it, and the output terminal provides output voltage. The PFC control circuit comprises: an on time control circuit configured to provide an on time control signal, the on time control signal configured to control an on period of the power switch; a first off time control circuit configured to provide a first off time control signal; a second off time control circuit configured to provide a second off time control signal; and a logic circuit selectively controlling the power switch working under CCM or DCM; wherein the first off time control signal is configured to control an off time period of the power switch under CCM, and the second off time control signal is configured to control the off time period of the power switch under DCM.

In yet another embodiment, a PFC control method for controlling an input current at an input terminal following an input voltage at the input terminal comprising: coupling a switching circuit having a power switch to the input terminal, and controlling the switching circuit working under CCM or DCM, wherein: an on time period of the power switch is controlled by a same on time control signal under both CCM and DCM; an off time period of the power switch under CCM mode is controlled by a first off time control signal, and the off time period under DCM mode is controlled by a second off time control signal; and a switching frequency of the power switch under DCM is lower than the switching frequency under CCM.

The PFC circuits and associated control circuits and control methods according to some embodiments of the present invention are able to work under both CCM and DCM, and further have advantages of high power factor, high conversion efficiency at light load, implemented with analog circuits and low lost, and so on.

BRIEF DESCRIPTION OF THE DRAWINGS

Non-limiting and non-exhaustive embodiments are described with reference to the following drawings. The drawings are only for illustration purpose. Usually, the drawings only show part of the systems or circuits of the embodiments.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The phrase "couple" may refer to direct connection or indirect connection. The indirect connection may refer to connection via media such as via a conductor, and such conductor may have resistance, parasitic inductance or capacitance, or via a semiconductor device such as a diode.

Figure 1:
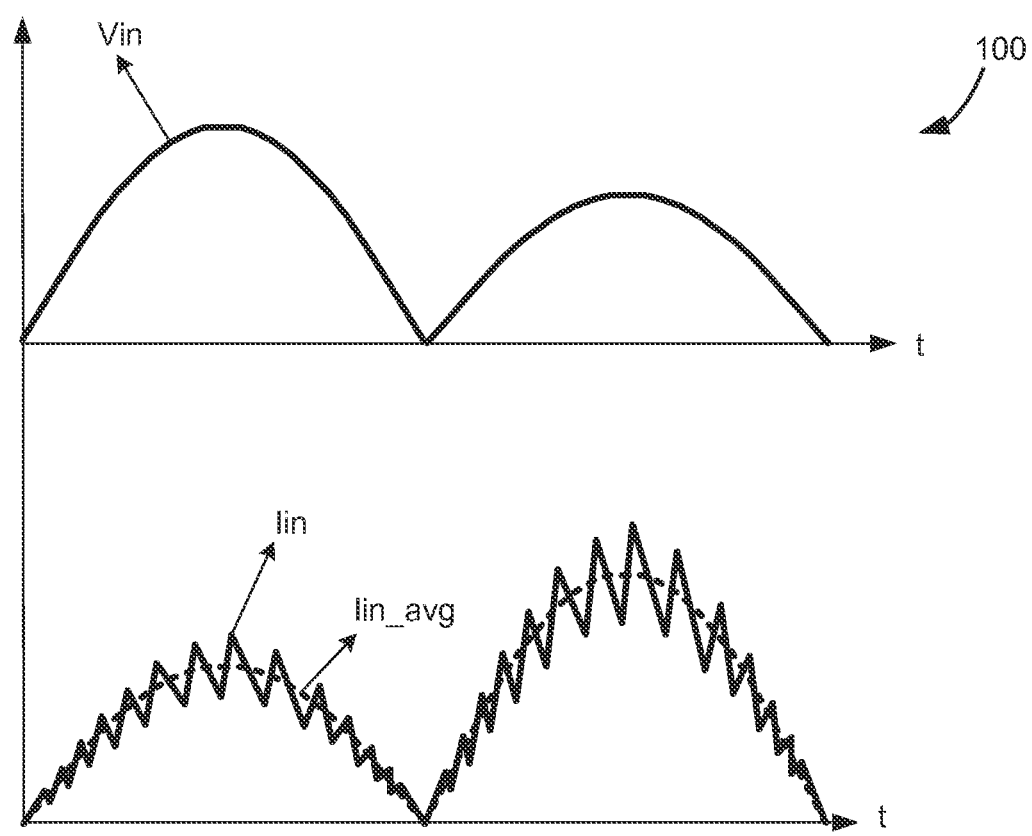
FIG. 1 illustrates a known waveform diagram of PFC control.
Figure 2:
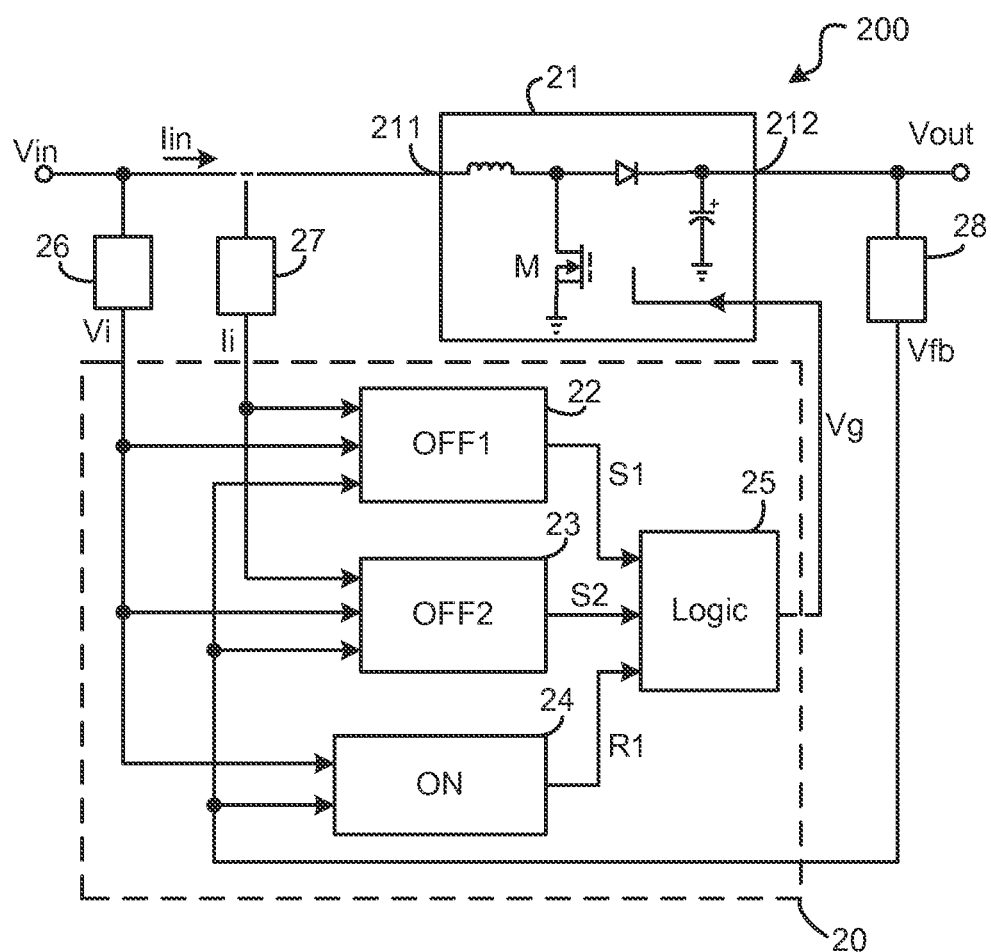
FIG. 2 illustrates a block diagram of a PFC circuit according to an embodiment of the present invention.

FIG. 2 illustrates a block diagram of a PFC circuit 200 according to an embodiment of the present invention. PFC circuit 200 comprises a switching circuit 21 and a PFC control circuit 20. Switching circuit 21 comprises a power switch M, and switching circuit 21 has an input terminal 211 and an output terminal 212, wherein input terminal 211 receives input voltage Vin, and a regulated input current Iin controlled by PFC control circuit 20 flows into input terminal 211. The switching action of power switch M is controlled by PFC control circuit 20. And input voltage Vin is converted into output voltage Vout at output terminal 212 via the switching action of power switch M. Control circuit 20 comprises an on time control circuit 24 (ON), a first off time control circuit 22 (OFF1), a second off time control circuit 23 (OFF2) and a logic circuit 25. On time control circuit 24 generates an on time control signal R1 which controls an on time period of power switch M, and power switch M is turned off at the end of the on time period. It is noted that a time period is a duration of time having a start time point and an end time point. In the shown embodiment, on time control signal R1 is generated according to input voltage Vin and output voltage Vout. In FIG. 2, switching circuit 21 comprises a boost converter. In other embodiments, switching circuit 21 may comprise a buck converter, a fly-back converter or other types of voltage converter.

An input voltage detection circuit 26 detects input voltage Vin and generates an input voltage detection signal Vi, and the input voltage detection circuit 26 may be any possible voltage detection circuit, such as a resistor divider. An input current feedback circuit 27 detects the input current Iin and provides an input current detection signal Ii. In one embodiment, input current detection signal Ii is a voltage signal, and input current detection signal Ii is proportional to input current Iin. An output voltage feedback circuit 28 is used to detect the output voltage Vout and generates an output voltage feedback signal Vfb. In one embodiment, output voltage feedback circuit comprises a resistor divider.

Thus, on time control signal R1 may be generated based on input voltage detection signal Vi and output voltage feedback signal Vfb. In another embodiment, on time control signal R1 is only generated based on input voltage detection signal Vi.

The first off time control circuit 22 generates a first off time control signal S1 configured to turn on power switch M under CCM and to control the off time period of power switch M. The first off time control circuit 22 generates the first off time control signal S1 based on input current detection signal Ii, input voltage detection signal Vi and output voltage feedback signal Vfb. In another embodiment, the off time control circuit 22 may generate the first off time control signal S1 based on input current detection signal Ii and output voltage feedback signal Vfb.

The second off time control circuit 23 generates a second off time control signal S2 configured to turn on power switch M under DCM, and to control the off time period of power switch M. The second off time control circuit 23 generates the second off time control signal S2 based on input current detection signal Ii, output voltage feedback signal Vfb and input voltage detection signal Vi. In another embodiment, the second off time control circuit 23 may generate the second off time control signal S2 based on input current detection signal Ii and output voltage feedback signal Vfb.

Logic circuit 25 has a first input coupled to on time control circuit 24 configured to receive on time control signal R1, has a second input coupled to the first off time control circuit 22 configured to receive the first off time control signal S1, has a third input coupled to the second off time control circuit 23 configured to receive the second off time control signal S2, and has an output coupled to switching circuit 21 configured to provide a switching control signal Vg which controls power switch M working under either CCM or DCM. Under CCM, the first off time control signal S1 configures to turn on power switch M and thus the off time period of switch M is controlled. And under DCM, the second off time control signal S2 configures to turn on power switch M and thus the off time period of switch M is controlled. In one embodiment, logic circuit 25 comprises an OR gate, and when the first off time control signal S1 is in an effective state for example logic HIGH state, the first off time control signal S1 controls the off time period of power switch M; and when the second off time control signal S2 is in an effective state, the second off time control signal S2 controls the off time period of power switch M. In other embodiments, logic gate 25 further comprises mode selection circuit which selects either CCM or DCM for switching circuit 21 based on input current detection signal Ii, and disables either the first off time control circuit 22 or the second off time control circuit 23 by puffing either the first off time control signal S1 or the second off time control circuit S2 to ineffective state such as LOW logic level. In another embodiment, a plurality of intermediate signals may be generated based on input current detection signal Ii, input voltage detection signal Vi and output voltage feedback signal Vfb, and the intermediate signals are supplied to the first off time control circuit 22 and the second off time control circuit 23 for generating the first off time control signal S1 and the second off time control signal S2. In one embodiment, one or some of the intermediate signals are further supplied to logic circuit 25.

Figure 3:
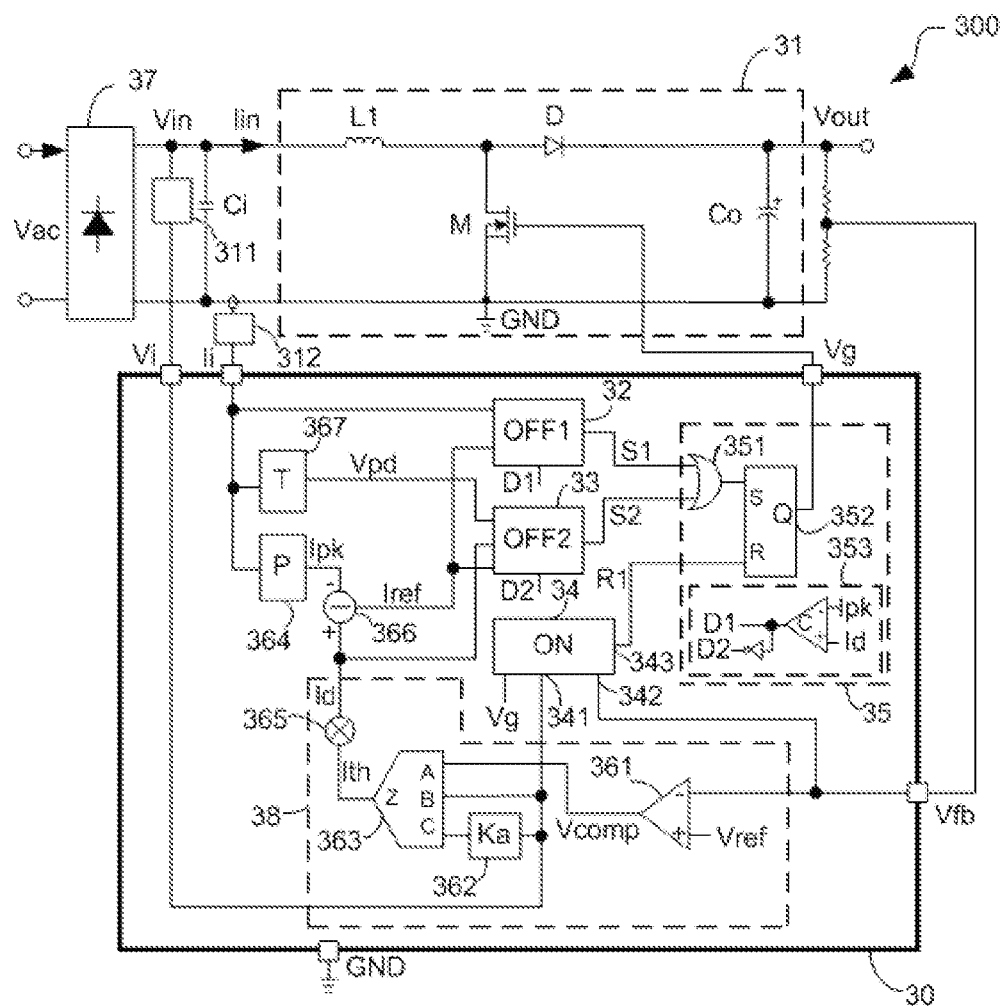
FIG. 3 illustrates a circuit diagram of a PFC circuit according to an embodiment of the present invention.

FIG. 3 illustrates a PFC circuit 300 according to an embodiment of the present invention. PFC circuit 300 comprises a rectifying circuit 37, a switching circuit 31 and a control circuit 30. However, in another embodiment, PFC circuit 300 may be without a rectifying circuit 37. In the shown embodiment, rectifying circuit 37 rectifies an AC sine-wave voltage signal Vac and provides a half-sine input voltage signal Vin. In description, the labels "Vin" and "Vout" may represent either the voltage signals, or represent the terminals of switching circuit. Similarly, labels Vi, Ii, Vfb, GND and Vg may either represent signals, or represent the terminals of PFC control circuit.

In the shown embodiment, switching circuit 31 comprises a boost converter. Switching circuit 31 has an input terminal Vin and an output terminal Vout. Switching circuit 31 comprises a power switch M, an inductor L1, a diode D and an output capacitor Co. Inductor L1 has a first end receiving input voltage Vin and has a second end coupled to a first end of power switch M. And a second end of power switch M is coupled to a reference ground GND. An anode of diode D is coupled to the second end of inductor L1, a cathode of diode D is coupled to a first end of capacitor Co, and a second end of output capacitor Co is coupled to reference ground GND. The cathode of diode D and the first end of output capacitor Co are coupled together to the output terminal to provide output voltage Vout. In another embodiment, diode D is replaced by a switch. Though an input capacitor Ci is shown in FIG. 3, it should be known that a PFC circuit may be implemented without an input capacitor. In another embodiment, switching circuit 31 may comprise a buck converter. Under the switching action of power switch M, switching circuit 31 regulates the output voltage Vout and input current Iin, and controls that the waveform shape of input current in follows that of input voltage Vin.

Control circuit 30 receives input voltage detection signal Vi which is indicative of input voltage Vin, input current detection signal Ii which is indicative of input current Ii and output voltage feedback signal Vfb which is indicative of output voltage, and provides switching control signal Vg coupled to power switch M to control the switching action of power switch M and to control that the waveform shape of input current Iin follows that of input voltage Vin. Control circuit 30 selectively works under CCM or DCM based on different load status. When working under CCM, the first off time control signal S1 outputted by the first off time control circuit 32 controls the off time period of power switch M. When working under DCM, the second off time control signal S2 outputted by the second off time control circuit 33 controls the off time period of power switch M. On time control circuit 34 controls the on time period of power switch M during both CCM and DCM, and an on time control signal R1 outputted by on time control circuit 34 is generated based on input voltage Vin and output voltage Vout. Control circuit 30 has an input voltage terminal Vi, an input current terminal Ii, an output voltage terminal Vfb and an switching control terminal Vg. Input voltage terminal Vi receives input voltage Vin or input voltage detection signal Vi. Output voltage terminal Vfb is coupled to the output terminal to receive the output voltage feedback signal Vfb. Switching control terminal Vg is coupled to the control end of power switch M and controls the ON and OFF actions of power switch M. In FIG. 3, an input voltage detection circuit 311 generates the input voltage detection signal Vi and an input current detection circuit 312 generates the input current detection signal Ii. In one embodiment, control circuit 30 comprises the input voltage detection circuit 311 and the input current detection circuit 312. However, in another embodiment, the input voltage detection circuit 311 and the input current detection circuit 312 are excluded from control circuit 30.

Figure 7:
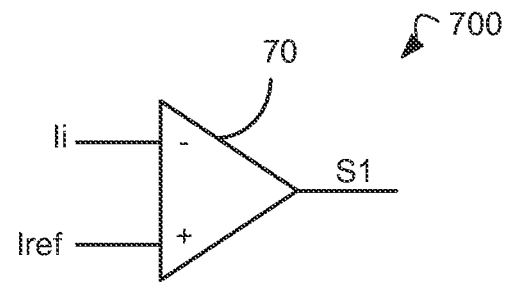
FIG. 7 illustrates a first off time control circuit according to an embodiment of the present invention.

Control circuit 30 comprises the first off time control circuit 32, the second off time control circuit 33, on time control circuit 34 and logic circuit 35. The first off time control circuit 32 generates the first off time control signal S1 based on input current detection signal Ii, average current reference signal Ith and peak current detection signal Ipk. In the shown embodiment, the first off time control circuit 32 generates the first off time control signal S1 based on input current detection signal Ii and a reference current signal Iref, where reference current signal Iref=2*Ith−Ipk. FIG. 7 illustrates a detailed first off time control circuit 700 according to an embodiment of the present invention.

Figure 9:
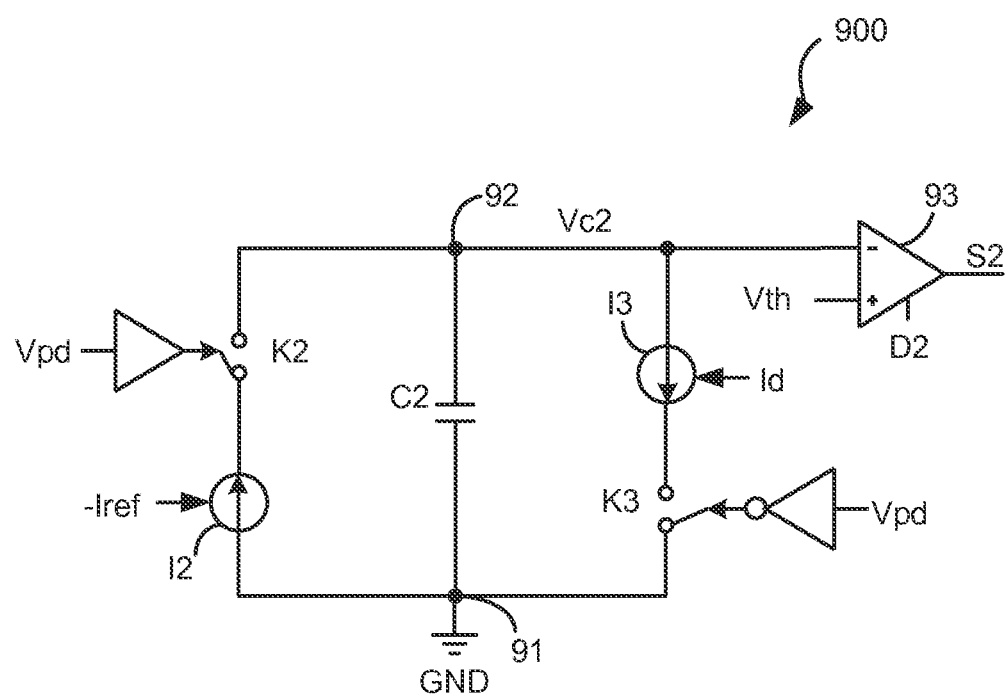
FIG. 9 illustrates a second off time control circuit according to an embodiment of the present invention.

The second off time control circuit 33 generates the second off time control signal S2 based on the average current reference signal Ith, peak current detection signal Ipk, and a current status detection signal Vpd. In the shown embodiment, the second off time control circuit 33 generates the second off time control signal S2 based on reference current signal Iref, double current reference signal Id and current status detection signal Vpd, where double current reference signal Id=2*Ith. FIG. 9 illustrates a detailed second off time control circuit according to an embodiment of the present invention.

Figure 5:
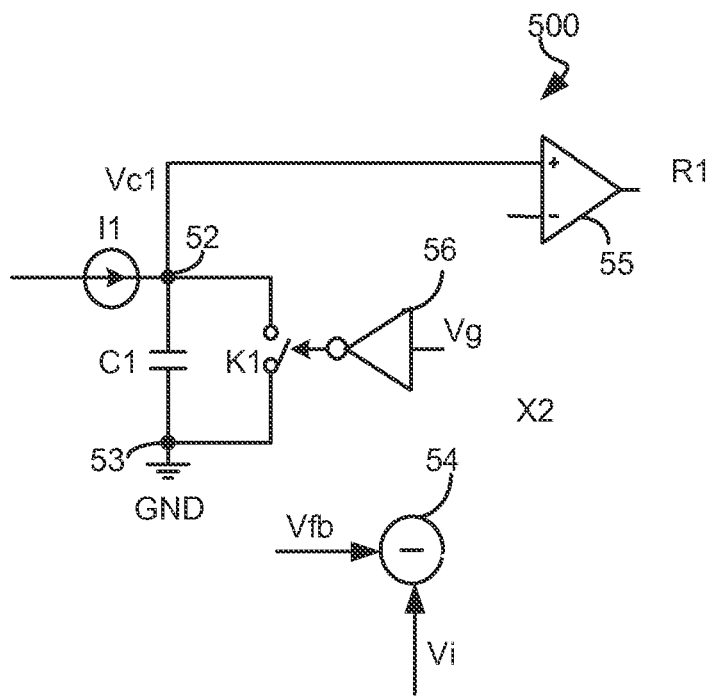
FIG. 5 illustrates an on-time control circuit according to an embodiment of the present invention.

On time control circuit 34 has a first input 341, a second input 342 and an output 343, where the first input 341 receives input voltage detection signal Vi, the second input 342 receives output voltage feedback signal Vfb, and the output 343 provides on time control signal R1. FIG. 5 illustrates a detailed on time control circuit 500 according to an embodiment of the present invention.

Logic circuit 35 comprises an OR gate 351, a latch circuit 252 and a mode selection circuit, 353. OR gate 351 has a first input, a second input and an output, wherein the first input is coupled to the first off time control circuit 32 to receive the first off time control signal S1, and the second input is coupled to the second off time control circuit 33 to receive the second off time control signal S2. Latch circuit 352 has a set input S, a reset input R and an output Q, wherein set input S is coupled to the output of OR gate 351, the reset input R is coupled to on time control circuit 34 to receive the on time control signal R1, and the output Q is coupled to the control end of power switch M to control the ON and OFF of power switch M. When the first off time control signal S1 or the second off time control signal S2 is in an effective state for example in logic HIGH state, OR gate 351 triggers latch circuit 352 to set HIGH, and switching control signal Vg transits to logic HIGH state to turn on power switch M. When on time control signal R1 is in logic HIGH state, latch circuit 352 is reset, and switching control signal Vg transits to logic LOW state to turn off power switch M. Power switch M remains in OFF state until latch circuit 352 is set again. Mode selection circuit 353 has two inputs and two enabling outputs, wherein a first input receives double current reference signal Id, a second input receives peak current detection signal Ipk, a first enabling output is coupled to the first off time control circuit 32, and a second enabling output is coupled to the second off time control circuit 33. Mode selection circuit 353 outputs a first enabling signal D1 at the first enabling output and a second enabling signal D2 at the second enabling output based on the double current reference signal Id and the peak current detection signal Ipk. Mode selection circuit 353 selectively disables the first off time control circuit 32 or the second off time control circuit 33 by the enabling signals D1 and D2, and switching circuit 31 selectively works under DCM or CCM. Mode selection circuit 353 comprises a comparator C which compares the double current reference signal Id and the peak current detection signal Ipk, where Id=2*Ith. When the double current reference signal Id is higher than the peak current detection signal Ipk, where 2*Ith>Ipk, the first enabling signal D1 is in logic HIGH, the second enabling signal D2 is in logic LOW, the first off time control circuit 32 is enabled, the second off time control circuit 33 is disabled, the second off time control signal S2 keeps in logic LOW level, and mode selection circuit 353 controls PFC circuit 300 working under CCM. When the double current reference signal Id is less than peak current detection signal Ipk, where 2*Ith>Ipk, the second enabling signal D2 is in logic HIGH, the first enabling signal D1 is in logic LOW, the second off time control circuit 33 is enabled, the first off time control circuit 32 is disabled, the first off time control signal S1 keeps in logic LOW, and accordingly mode selection circuit 353 controls PFC circuit 300 working under DCM.

Control circuit 30 may further comprises a reference signal generator 38, a peak current detection circuit 364 (P), a subtracting circuit 366 and a current status detection circuit 367 (T). Where reference signal generator 38 generates average current reference signal Ith or double current reference signal Id based on the input voltage detection signal Vi and output voltage feedback signal Vfb. Double current reference signal Id is twice the value of the average current reference signal Ith. And the average current reference signal Ith is the desired average value of input current detection signal Ii.

In the shown embodiment, reference signal generator 38 comprises an error amplifying circuit 361, an averaging circuit, a first multiplying circuit 363 and a second multiplying circuit 365. Error amplifying circuit 361 outputs an output voltage compensation signal Vcomp which is an integrated signal of the difference between the output voltage feedback signal Vfb and a reference voltage signal Vref. Control circuit 30 controls that the output voltage feedback signal Vfb is regulated to the value of reference voltage signal Vref. Error amplifying circuit 361 has a first input receiving output voltage feedback signal Vfb, a second input receiving reference voltage signal Vref, and an output providing output voltage compensation signal Vcomp. Averaging circuit 362 calculates the average value of input voltage detection signal Vi in a predetermined time period periodically, and provides an average input voltage signal Viav at an output of averaging circuit 362. Thus average input voltage signal Viav is indicative of the average value of input voltage Vin. The first multiplying circuit 363 has three inputs and an output, wherein a first input A is coupled to the output of error amplifying circuit 361 to receive the output voltage compensation signal Vcomp, a second input B receives input voltage detection signal Vi, a third input C is coupled to the output of averaging circuit 362 to receive average input voltage signal Viav, and the output of the first multiplying circuit 363 provides the average current reference signal Ith. And in one embodiment, average current reference signal Ith=(Vi*Vcomp)/Viav2. Average current reference signal Ith is indicative of the average value of input current Iin.

The second multiplying circuit 365 is coupled to the output of the first multiplying circuit 363, and generates the double current reference signal Id, where Id=2*Ith. In one embodiment, reference signal generator 38 has only one multiplying circuit which is equal to the combination of the first multiplying circuit 363 and the second multiplying circuit 365. The only one multiplying circuit receives the output voltage compensation signal Vcomp, the input voltage detection signal Vi and the average input voltage signal Viav, and provides double current reference signal Id directly. In one embodiment, control circuit 30 does not have subtracting circuit 366, reference signal generator 38 further receives peak current detection signal Ipk and outputs both double current reference signal Id and reference current signal Iref.

Peak current detection circuit 364 receives input current detection signal Ii and provides peak current detection signal Ipk, where peak current detection signal Ipk is proportional to the peak value of the input current detection signal Ii in a switching cycle period.

Subtracting circuit 366 is coupled to peak current generator 364 and reference signal generator 38, subtracts peak current detection signal Ipk from double current reference signal Id and puts out reference current signal Iref, where Iref=2*Ith−Ipk. In one embodiment, control circuit 30 further comprises a second subtracting circuit to subtract double current reference signal Id from peak current detection signal Ipk, which is Ipk−2*Ith.

Current status detection circuit 367 has an input receiving input current detection signal Ii and puts out current status detection signal Vpd. When input current Iin flows through the input terminal which means the input current detection signal Ii is higher than zero or higher than a reference value, current status detection signal Vpd is in effective state of HIGH logic. And when input current detection signal Ii approximates zero, current status detection signal Vpd is in ineffective state of LOW logic.

In a preferred embodiment, on time control circuit 34 in FIG. 3 comprises a circuit 500 in FIG. 5, the first off time control circuit 32 comprises a circuit 700 in FIG. 7, and the second off time control circuit 33 comprises a circuit 900 in FIG. 9.

Figure 4:
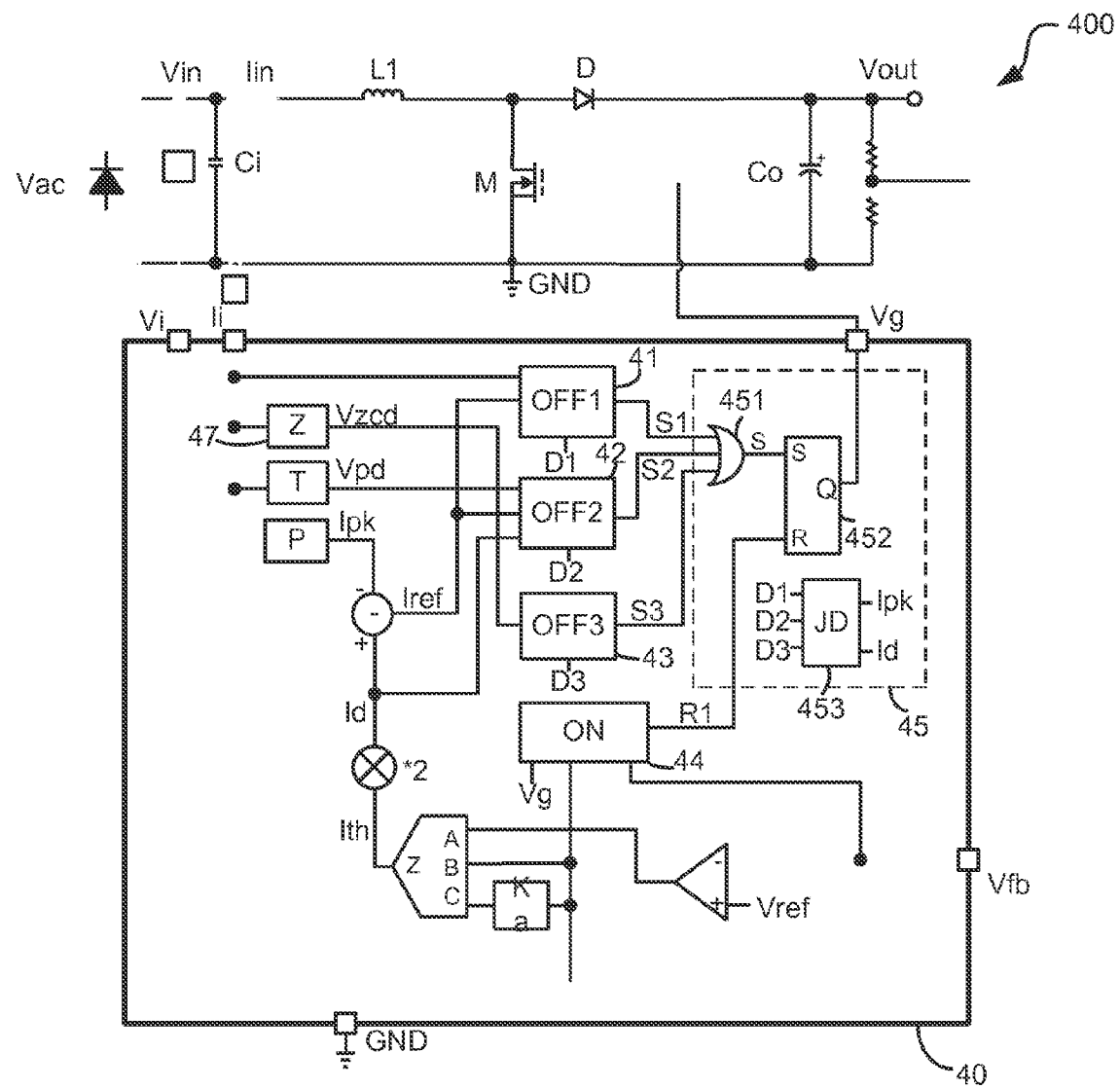
FIG. 4 illustrates a circuit diagram of a PFC circuit according to another embodiment of the present invention.

FIG. 4 shows a PFC circuit 400 according to another embodiment of the present invention. Compared to FIG. 4, control circuit 40 of PFC circuit 400 further comprises a third off time control circuit 43 and a zero current detection circuit 47. The third off time control circuit 43 generates a third off time control signal S3 to control the ON time point and off time period of power switch M under Boundary Conduction Mode (BCM). Where the OR gate 451 in logic circuit 45 further comprises a third input receiving the third off time control signal S3. OR gate 451 generates an off time control signal S to control power switch M working under CCM, DCM or BCM. Logic circuit 45 comprises OR gate 451, latch 452 and mode selection circuit 453. Where mode selection circuit 453 generates a first enabling signal D1, a second enabling signal D2 and a third enabling signal D3 based on an peak current detection signal Ipk and double current reference signal Id. The first enabling signal D1 is coupled to the first off time control circuit 41, the second enabling signal D2 is coupled to the second off time control circuit 42, and the third enabling signal D3 is coupled to the third off time control circuit 43. In one embodiment, when 2*Ith−Ipk>Iz, where Iz is a small positive reference value, mode selection circuit 453 controls power switch M working under CCM, the first enabling signal D1 is in logic HIGH, the second enabling signal D2 and the third enabling signal D3 are in logic LOW, thus the first off time control circuit 41 is enabled, the first off time control signal S1 controls the off time period of power switch M, the second off time control signal S2 and the third off time control signal S3 are in logic LOW. When Ipk−2Ith>Iz, mode selection circuit 453 controls power switch M working under DCM, the second enabling signal D2 is in logic HIGH to enable the second off time control circuit 42, the first enabling signal D1 and the third enabling signal D3 are in logic LOW, accordingly, the second off time control signal S2 controls the off time period of power switch M, and the first off time control signal S1 and the third off time control signal S3 are in logic LOW. When −Iz<2*Ith−Ipk<Iz, mode selection circuit 453 controls power switch M working under BCM, the third enabling signal D3 is in logic HIGH to enable the third off time control circuit 43, the first enabling signal D1 and the second enabling signal D2 are in logic LOW, accordingly, the third off time control signal S3 controls the off time period or the on time point of power switch M.

Zero current detection circuit 47 generates a zero current detection signal Vzcd which present a HIGH logic signal at the falling edged of when input current Iin decreases to zero. The third off time control circuit 43 receives the zero current detection signal Vzcd and the third enabling signal D3, and generates the third off time control signal S3. A detailed embodiment of a third off time control circuit will be described in FIG. 11. In a preferred embodiment, the first off time control circuit 41 comprises a circuit 700 shown in FIG. 7, the second off time control circuit 42 comprises a circuit, 900 shown in FIG. 9, the third off time control circuit 43 comprises the circuit 1100 shown in FIG. 11, and the on time control circuit 44 comprises a circuit 500 shown in FIG. 5.

FIG. 5 illustrates an on time control circuit 500 according to an embodiment of the present invention. On time control circuit 500 comprises a current source I1, a capacitor C1, a charging switch K1, a subtracting circuit 54 and a comparing circuit 55. The current source I1 is coupled to the output voltage and provides a current proportional to the output voltage, or proportional to the output voltage feedback signal Vfb. Capacitor C1 is coupled to current source I1, and current source I1 charges capacitor C1 when charging switch K1 is in OFF state. Capacitor C1 has a first end 53 and a second end 52, wherein the first end 53 is coupled to reference ground GND, the second end 52 provides a voltage signal Vc1. Charging switch K1 has a first end coupled to the first end 53 of capacitor C1, a second end coupled to the second end 52 of capacitor C1, and a control end coupled to switching control signal Vg such that charging switch K1 is in ON state when power switch M is in OFF state and is in OFF state when power switch M is in ON state. In the shown embodiment, on time control circuit 500 further comprises a driving circuit 56. Driving circuit 56 has an input receiving switching control signal Vg, and an output coupled to the control end of charging switch K1. When switching control signal Vg is in logic LOW, driving circuit 56 turns on charging switch K1. And when switching control signal Vg is in logic HIGH, driving circuit 56 turns off charging switch K1. Subtracting circuit 54 receives input voltage detection signal Vi and output voltage feedback signal Vfb, and generates a signal X2=Vfb−Vi. Comparing circuit 55 has a first input coupled to the second end 52 of capacitor C1 to receive voltage signal Vc1, has a second input coupled to the output of subtracting circuit 54 to receive signal X2, and has an output providing the on time control signal R1 which is supplied to an input of the logic circuit. When power switch M is in OFF state, switching control signal Vg is in logic LOW, charging switch K1 is in ON state, voltage Vc1 across capacitor C1 is zero, and on time control signal R1 is in logic LOW. When power switch M is in ON state, charging switch K1 is in OFF state, current source I1 charges capacitor C1, and voltage Vc1 increases. When voltage signal Vc1 is higher than signal X2, on time control signal R1 transits in logic HIGH to turn off power switch M, and thus the on time period is determined as Ton=((Vout−Vin)/Vout)*Tcst, where Tcst=a1−C1, and a1 is a constant. Thus on time Ton controlled by on time control signal R1 increases when Vin decreases and decreases when Vin increases.

Figure 6:
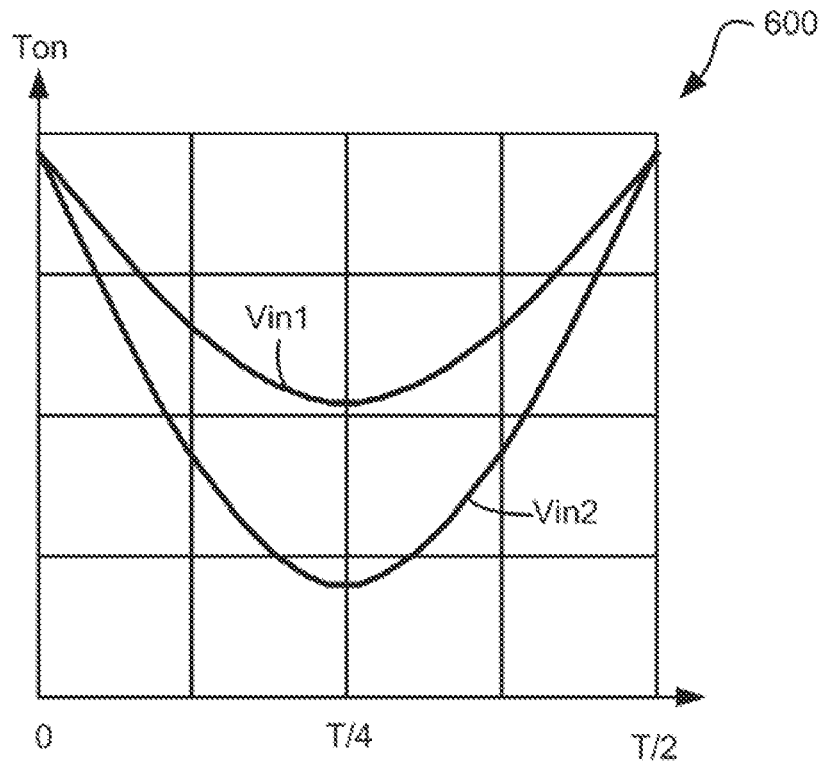
FIG. 6 illustrates a waveform diagram of on time versus time with different input voltages in a half-sine period.

FIG. 6 illustrates a waveform diagram of on time control signal Ton versus time in a half-sine period of input voltage, according to an embodiment of the present invention. When input voltage Vin is the lowest, (at the time of 0 and T/2), on time period Ton is the highest. Where T represents the period of input voltage Vin. When input voltage is the highest (T/4), on time period Ton is the shortest. That is, a low input voltage is correspondence to a long on time period. The upper line corresponds to when the peak value of the input voltage is Vin1, and the lower line corresponds to when the peak value of the input voltage is Vin2, where Vin2>Vin1.

FIG. 7 illustrates a first off time control circuit 700 according to an embodiment of the present invention. The first off time control circuit 700 comprises a comparing circuit 70. Comparing circuit 70 compares the input current detection signal Ii to a reference current signal Iref, and generates the first off time control signal S1. In the shown embodiment, a non-inverting input (+) receives reference current signal Iref, an inverting input (−) receives the input current detection signal Ii. And the output of comparing circuit 70 provides the first off time control signal S1. When input current detection signal Ii is less than reference current signal Iref, the first off time control signal S1 is in effective state of logic HIGH. In one embodiment, the first off time control circuit 700 further has an enabling end coupled to the first enabling signal D1, and when the first enabling signal D1 is in logic HIGH, the first off time control circuit 700 works normally. And when the first enabling signal D1 is in logic LOW, the first off time control signal S1 is in logic LOW. In another embodiment, the first off time control circuit is not coupled to an enabling signal, and the first off time control signal S1 supplied to the logic circuit may be blocked by a logic state of the enabling signal.

Figure 8:
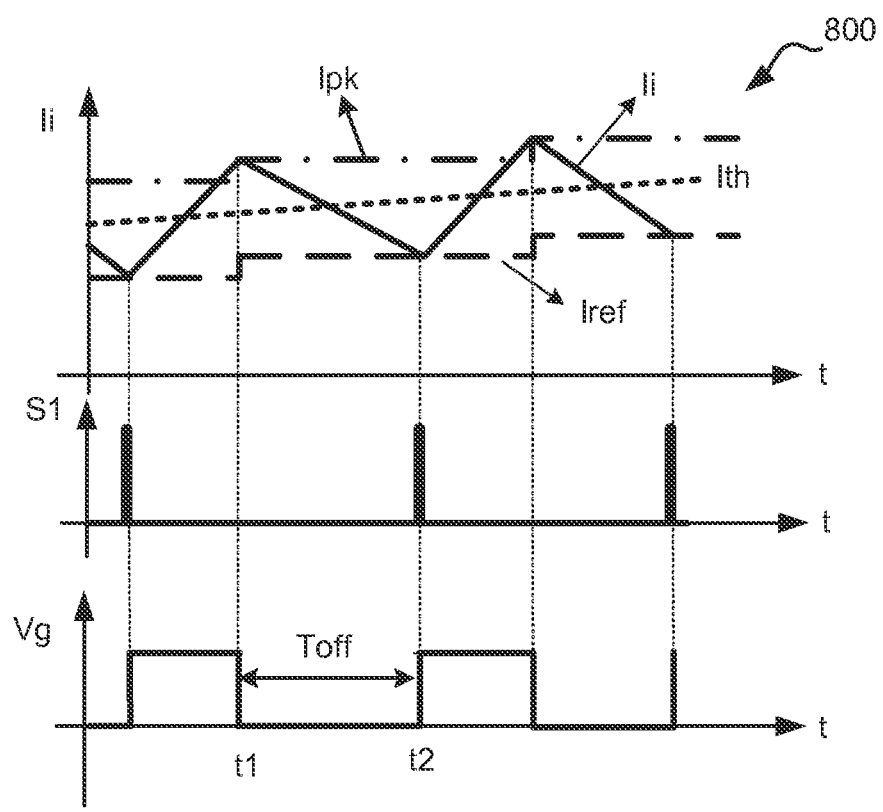
FIG. 8 illustrates a waveform diagram of signals in a PFC circuit with reference to FIG. 3 and FIG. 7 according to an embodiment of the present invention.

FIG. 8 illustrates a waveform diagram of signals with reference to FIG. 3 and FIG. 7 according to an embodiment of the present invention. When Iref is higher than zero, that is 2*Ith−Ipk>0, switch M works under CCM, and the first off time control signal S1 controls off time period Toff of power switch M. Peak current detection signal Ipk updates once at every switching cycle, and shows a step shape. average current reference signal Ith changes according to input voltage Vin and also shows a half-sine shape. In one embodiment, average current reference signal Ith= (Vi*Vcomp)/Viav2 as described above.

In the shown embodiment, the reference current signal Iref=2*Ith−Ipk. At time t1, on time control circuit resets switching control signal Vg to logic LOW, power switch M is turned off, input current detection signal Ii decreases. At time t2, input current detection signal Ii decreases to be lower than reference current signal Iref, the first off time control signal S1 generated by comparing circuit 70 transits in logic HIGH, and switching control signal Vg transits in logic HIGH to turn on power switch M. And thus the off time period Toff is determined at the time point T2 that power switch M is turned on. In one embodiment, on time control circuit is shown as in FIG. 5, and one switching period is a constant value.

FIG. 9 illustrates a second off time control circuit 900 according to an embodiment of the present invention. The second off time control circuit 900 receives the second enabling signal D2. When enabling signal D2 is in effective state, the second off time control circuit 900 controls the time point of turning on power switch M and to control the off time period of power switch M, and power switch M works under DCM. When enabling signal D2 is in ineffective state, the second off time control signal S2 is in logic LOW.

The second off time control circuit 900 comprises a first current source I2, a charging switch K2, a second current source I3, a discharging switch K3, a capacitor C2 and a comparing circuit 93. Current source I2 generates a current proportional to the reference current signal Iref, that is $I2=K*(-Iref)=K*(Ipk-2*Ith)$, where k is positive constant. In one embodiment, the second off time control circuit 900 further comprises a subtracting circuit which subtracts double current reference signal Id from peak current detection signal Ipk and generates a second reference current signal $Iref2=Ipk-2*Ith$, and the first current source $I2=K*Iref2$. In another embodiment, the second off time control circuit 900 shares a same subtracting circuit with the first off time control circuit to generate the reference current signal $Iref=2*Ith-Ipk$. And current source I2 is proportional to the reverse of reference signal $(-Iref=Ipk-2*Ith)$. Charging switch K2 has a control end coupled to the logic circuit 35 with reference to FIG. 3 and is coupled in series with current source I2. The second current source I3 provides a current I3 proportional to the double current reference signal Id, that is $I3=k*Id=K*2*Ith$. Discharging switch K3 is coupled in series with current source I3. And discharging switch K3 has a control end coupled to the output of the logic circuit. Capacitor C2 has a first end 91 coupled to the reference ground GND, has a second end 92 providing a voltage signal Vc2. When input current Iin is higher than zero, or current status detection signal Vpd is in logic LOW, discharging switch K3 is in ON state, current source I3 discharges capacitor C2 and voltage signal Vc2 decreases. Comparing circuit 93 compares voltage Vc2 across capacitor C2 with a threshold signal Vth and provides the second off time control signal S2.

Figure 10:
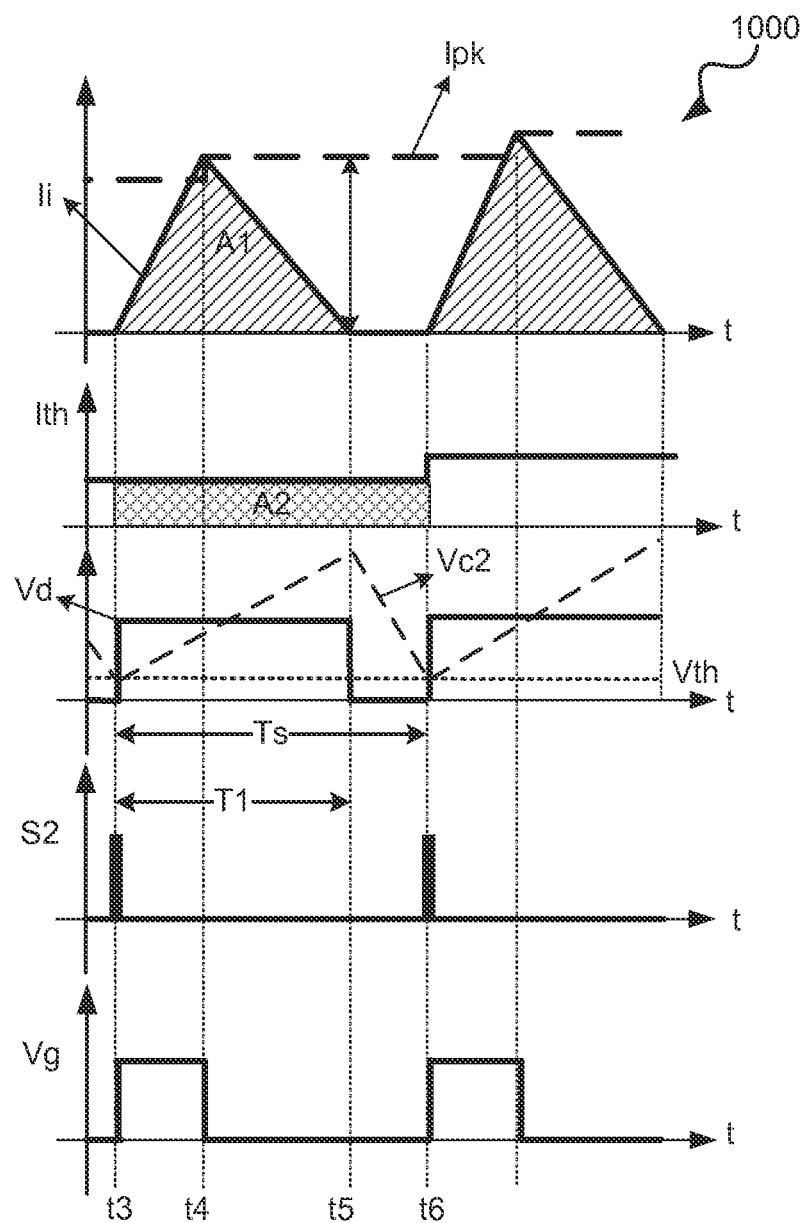
FIG. 10 illustrates a waveform diagram of signals in a PFC circuit with reference to FIG. 3 and FIG. 9 according to an embodiment of the present invention.

FIG. 10 illustrates a waveform diagram 1000 of signals with reference to FIG. 3 and FIG. 9, according to an embodiment of the present invention. When $Iref=2*Ith-Ipk$ is lower than zero, which means that double current reference signal $2*Ith$ is less than peak current detection signal Ipk, power switch M works under DCM, and the second off time control signal S2 controls the turn on point of power switch M. In one switching cycle Ts, during a time period T1 from time t3 to t5, input current Iin is detected to be higher than zero, current status detection signal Vpd is in logic HIGH, and current source I2 charges capacitor C2, voltage Vc2 across capacitor C2 increases. During time period of t5 to t6, input current Iin equals zero, current status detection signal Vpd is in logic LOW, and current source I3 discharges capacitor C2, voltage Vc2 decreases. At time t6, voltage Vc2 is less than the second threshold Vth, the second off time control signal S2 generated by comparing circuit 93 is in logic HIGH, switching control signal Vg transits to logic HIGH to turn on power switch M. At that time, input current detection signal Ii increases, current status detection signal Vpd transits to logic HIGH, and current source I2 charges capacitor C2. The charging current I2 is proportional to $Iref=Ipk-2*Ith$, and discharging current I3 is proportional to double current reference signal $Id=2*Ith$. Thus $Ts=Ipk*T1/(2*Ith)$, where Ts is one switching cycle period, and T1 is the time period where input current Iin flows and is higher than zero in a switching period Ts. Thus, $Ith*Ts=Ipk*T1/2$, which means the area of A2 in FIG. 10 equals the area of A1. Thus DCM function is fulfilled.

Figure 11:
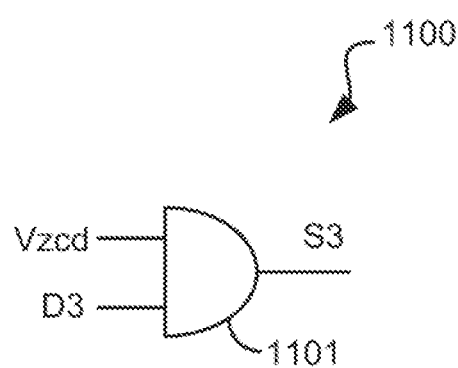
FIG. 11 illustrates a third off time control circuit according to an embodiment of the present invention.

FIG. 11 illustrates a third off time control circuit 1100 according to an embodiment of the present invention. The third off time control circuit 1100 comprises an AND gate 1101. And gate 1101 has a first input receiving zero current detection signal Vzcd, a second input receiving third enabling signal D3, and has an output providing the third off time control signal S3. When enabling signal D3 is in logic HIGH, PFC circuit 400 works under BCM, the logic value of the third off time control signal S3 is the same with zero current detection signal Vzcd. Thus, under BCM, when zero current detection signal Vzcd is in logic HIGH, power switch M is turned on.

Figure 12:
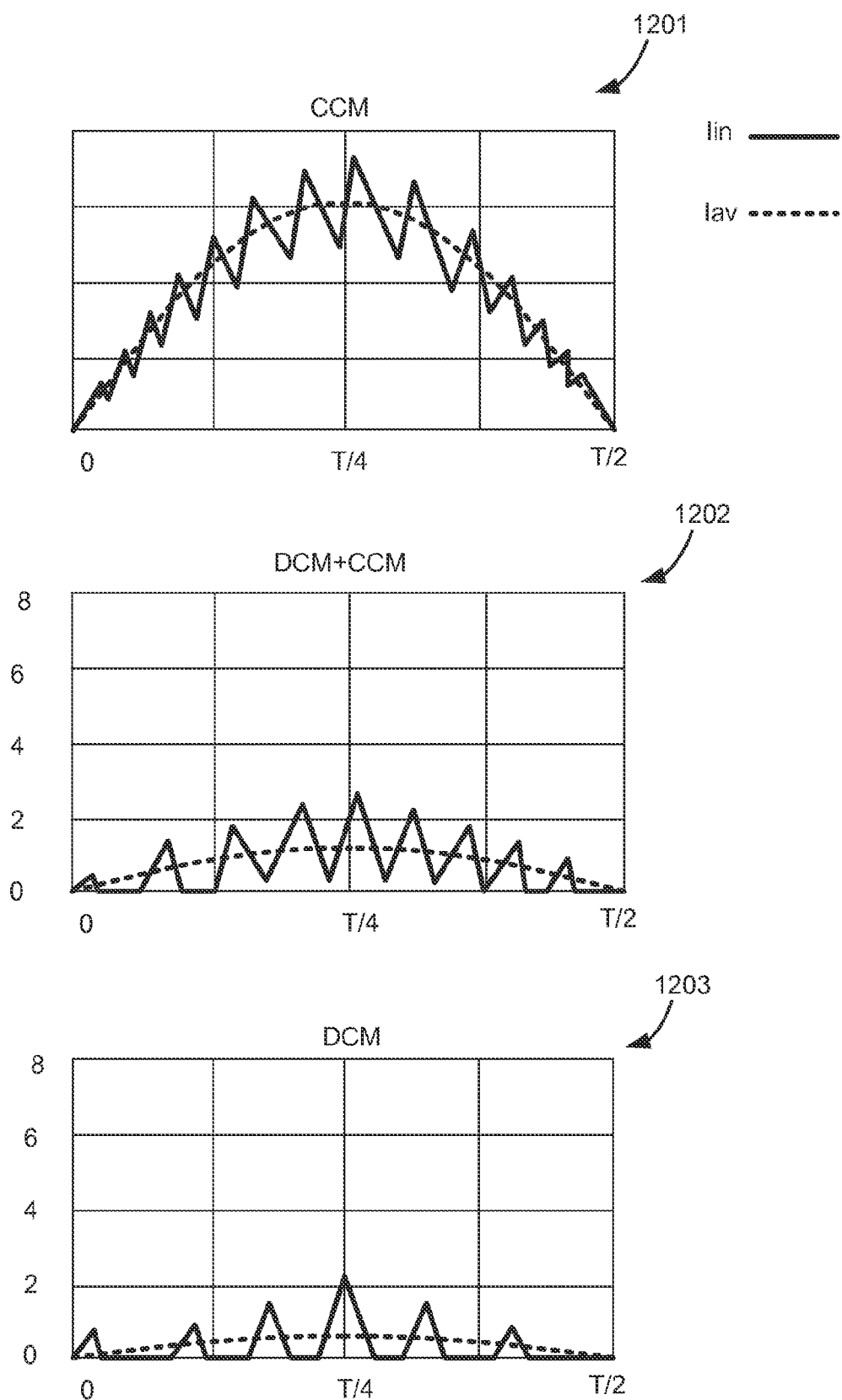
FIG. 12 illustrates waveform diagrams showing input current versus time under different load conditions according to an embodiment of the present invention.

FIG. 12 illustrates a simulation waveform diagram of signals at different load conditions in a half-sine waveform period according to an embodiment of the present invention. Waveforms 1201-2103 illustrate input current Iin and average input current Iav versus time in a half-sine waveform period. Average input current Iav is the average of input current Iin. It can be seen that average input current Iav follows the waveform shape of input voltage well and shows up a half-sine waveform shape. Diagram 1201 shows input current Iin and average input current Iav at heavy load condition, and power switch M works under CCM. Diagram 1202 shows input current Iin and average input current Iav under medium load level. In the half-sine waveform period, at the period when input current Iin is relatively high for example near T/4 point, power switch M works under CCM, and at the period when input current Iin is relatively low for example near 1 and T/2 point, power switch M works under DCM. Diagram 1203 shows input current Iin and average input current Iav under light load condition and power switch M works under DCM in the half-sine waveform period. The light load and heavy load conditions may be observed by setting thresholds according to different needs. In one embodiment, the light load and heavy load conditions may be set by adjusting the values of current source and capacitor in the on time control circuit.

Figure 13:
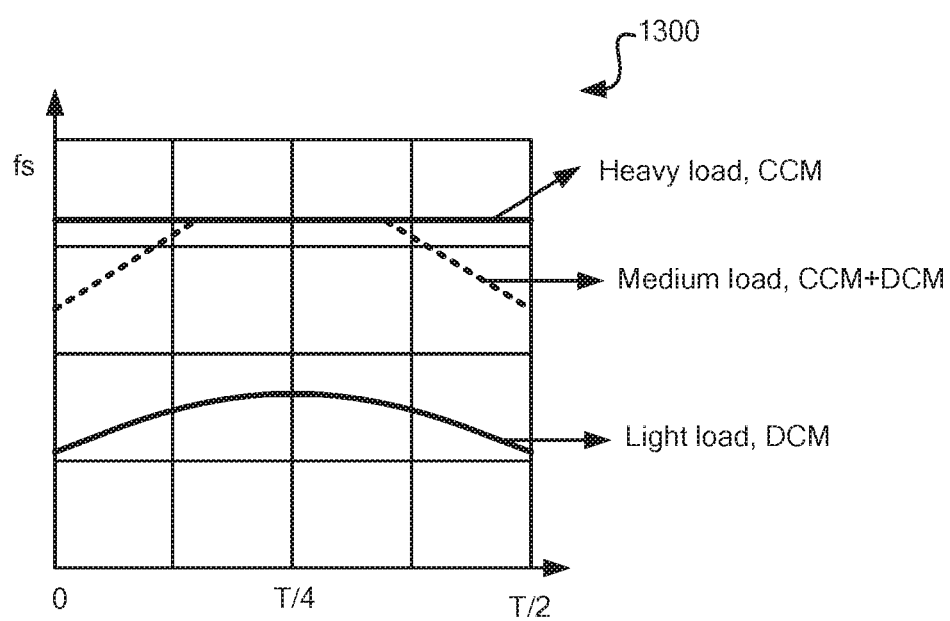
FIG. 13 illustrates waveform diagram of frequency versus time under different load conditions according to an embodiment of the present invention.

FIG. 13 illustrates a waveform diagram showing switching frequencies of power switch M at different load conditions in a half-sine input voltage period, according to an embodiment of the present invention. At heavy load, the PFC circuit works under CCM, and the frequency is constant. At medium load condition, when input current is relatively high, the PFC circuit works under CCM and the frequency is constant, and when input current is relatively low, the PFC circuit works under DCM, and the frequency changes with the input current. The frequency during DCM is smaller than that during CCM, and a lower input current corresponds to a lower switching frequency. At the light load condition, the PFC circuit works under DCM, and the switching frequency is smaller than that under CCM, which improves the light load switching efficiency.

Figure 14:
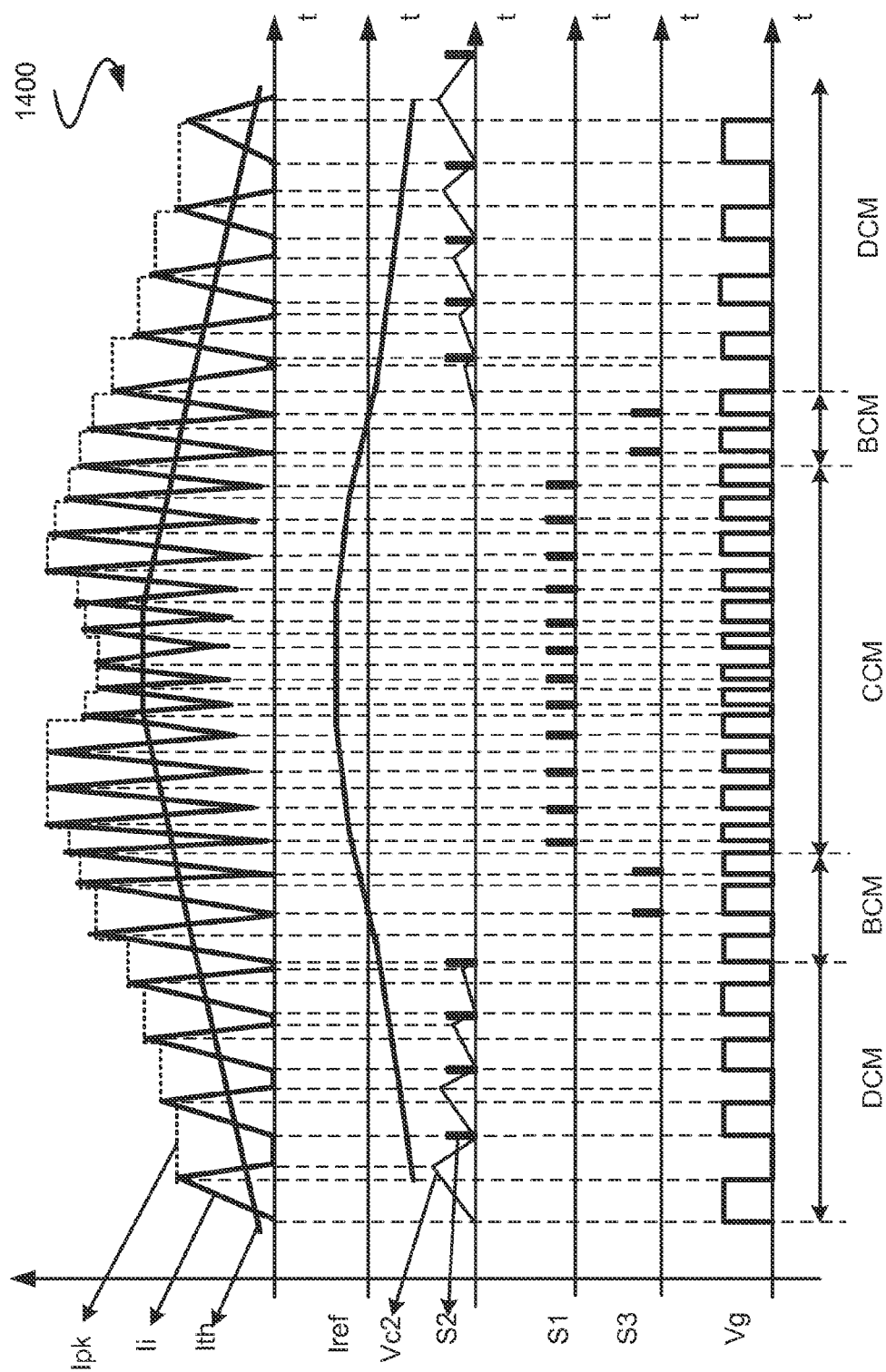
FIG. 14 illustrates waveform diagram of signals in a PFC circuit with reference to FIG. 4 according to an embodiment of the present invention.

FIG. 14 illustrates a waveform diagram 1400 of signals in a PFC circuit with reference to FIGS. 4, 5, 7, 9 and 11 according to an embodiment of the present invention. This diagram shows a medium bad condition where PFC circuit works under DCM when input current is relatively low, works under CCM when input current is relatively high, and works under BCM between CCM and DCM. The diagram shows input current detection signal Ii, peak current detection signal Ipk, average current reference signal Ith, reference current signal Iref, the first off time control signal S1, the second off time control signal S2, voltage Vc2 across capacitor C2, the third off time control signal S3 and switching control signal Vg. Under CCM, switching control signal Vg transits HIGH when the first off time control signal S1 transits HIGH to turn on power switch M. And then power switch M is turned off after an on time period. In the embodiment of on time control circuit as shown in FIG. 5, the on time of on time control signal R1 under CCM is shorter than that under DCM. Thus the switching frequency under CCM is higher than that under DCM, which improves the switching efficiency. Under BCM, switching control signal Vg transits HIGH when the third off time control signal S3 transits HIGH to turn on power switch M. And then power switch M is turned off after an on time period.

In one embodiment, when reference current signal Iref approximates zero, which is $-Iz<2*Ith-Ipk<Iz$, (z is a small positive constant), PFC circuit works under BCM; when reference current signal Iref is higher than zero, which is $2*Ith-Ipk>Iz$, PFC circuit works under CCM; and when reference current signal Iref is lower than zero, which is $Ipk-2*Ith>Iz$, PFC circuit works under DCM.

In detail, when reference current signal Iref is higher than zero, which means the double current reference signal $2*Ith$ is higher than the peak current detection signal Ipk, $Iref=2*Ith-Ipk>Iz$, power switch M works under COM. At this time, the second off time control signal S2 and the third off time control signal S3 are in logic LOW, or are blocked. When input current detection signal Ii decreases to below the reference current signal Iref, the first off time control signal S1 is in logic HIGH, switching control signal Vg transits HIGH and power switch M is turned on. Accordingly, input current detection signal Ii increases. At the end of on time period, switching control signal Vg decreases, and power switch M is turned off. Accordingly, input current detection signal Ii decreases, and another switching cycle begins.

When reference current signal Iref is less than zero, which means the double current reference signal is less than peak current reference signal Ipk, $Iref=2*Ith-Ipk<-Iz$, power switch M works under DCM. At this time, the first off time control signal S1 and the third off time control signal S3 are in logic LOW. Capacitor C2 is charged when input current detection signal Ii is higher than zero, and is discharged when input current detection signal equals zero. When voltage Vc2 across capacitor C2 decreases below a threshold, the second off time control signal S2 transits to logic HIGH, switching control signal Vg transits high, and power switch M is turned on. Accordingly, input current detection signal Ii increases. After an on time period determined by on time control signal R1, switching control signal Vg decreases and power switch M is turned off. Accordingly, input current detection signal Ii decreases, and another switching cycle begins.

When reference current signal Iref is near zero, which is $-Iz<2*Ith-Ipk<Iz$, power switch M works under BCM. At this time, the first off time control signal S1 and the second off time control signal S2 are in logic LOW. In another embodiment, at this time, the first off time control signal S1 and the second off time control signal S2 are blocked. When input current is at zero, the third off time control signal S3 transits to logic HIGH, switching control signal Vg increases to turn on power switch M. After an on time period determined by on time control signal R1, switching control signal Vg decreases to turn off power switch M. And another switching cycle begins.

From FIG. 14, it can be seen that the average current reference value Ith is in half-sine waveform shape and thus the input current may follow the input voltage well and fulfills the PFC control. At the meantime, the switching frequency under DCM is lower than the switching frequency under CCM, thus the switching efficiency is improved. And the circuits in the embodiments are analog circuits which lower down system complexity and cost.

Figure 15:
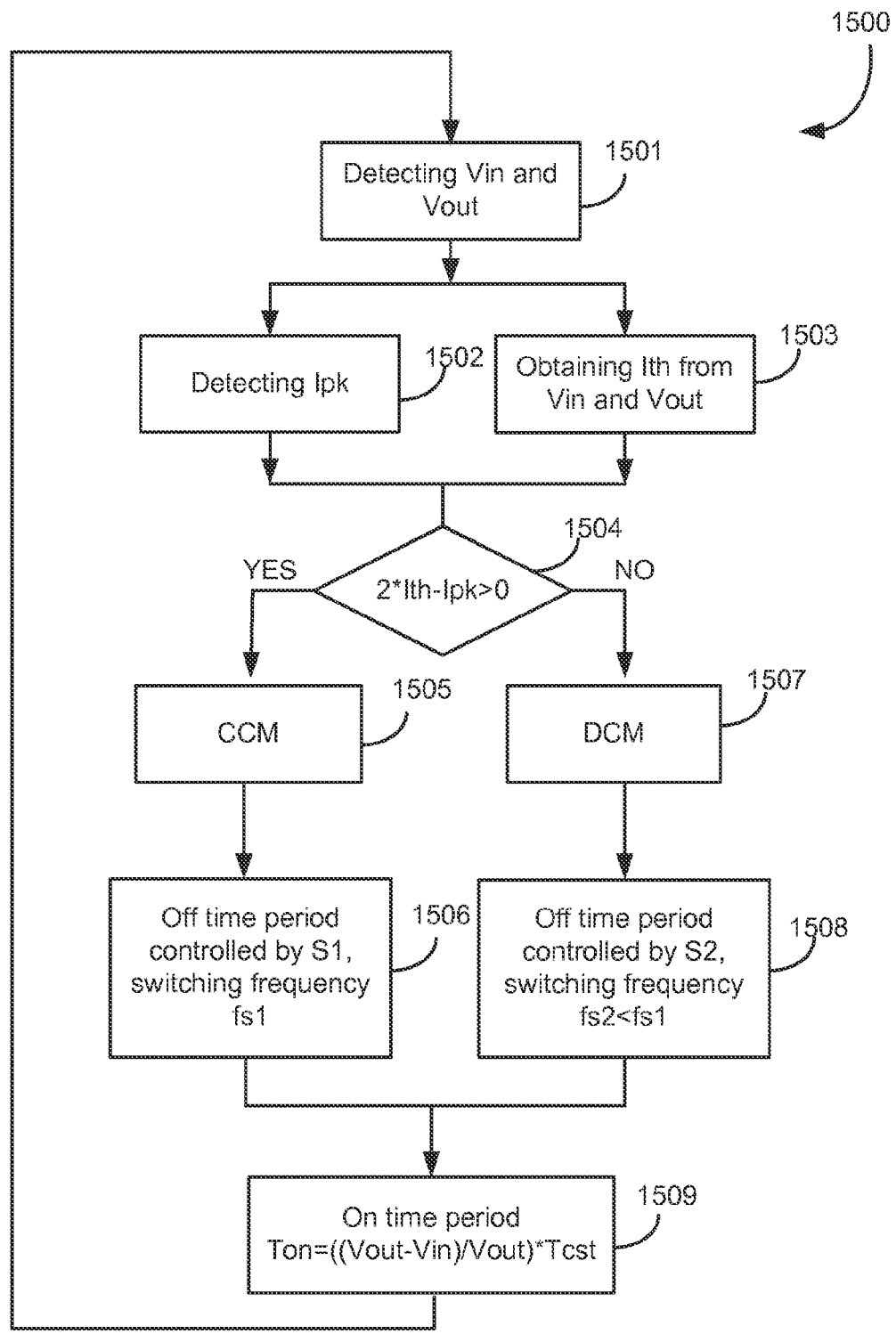
FIG. 15 illustrates a PFC control method according to an embodiment of the present invention.

FIG. 15 illustrates a method 1500 of PFC control according to an embodiment of the present invention. Method 1500 comprises selectively working under CCM or DCM according to the load condition, where the switching frequency under CCM is higher than that under DCM, and working with the same on time control mode controlled by a same on time control signal under both CCM and DCM. In one embodiment, the on time period $Ton=((Vout-Vin)/Vout)*Tcst$, where $Tcst=a1*C1$ as described with reference to FIG. 5.

Method 1500 adopts an analog circuit to implement PFC control, and controls that the frequency under DCM is lower than that under CCM, and thus efficiency at light load condition is improved.

Method 1500 comprises at step 1501 detecting input voltage yin and output voltage Vout; at step 1502 detecting the peak value of input current and get a peak current reference signal Ipk; at step 1503 calculating and obtaining an average current reference signal Ith based on the input voltage Vin and the output voltage Vout, and such that average current reference signal Ith changes with the input voltage and output voltage; at step 1504, judging the load condition according to a reference current signal Iref, where reference current signal Iref is obtained by subtracting peak current reference signal Ipk from double value of the average current reference signal Ith, which is $Iref=2*Ith-Ipk$.

When reference current signal Iref is higher than zero, which is $2*Ith-Ipk>0$, method 1500 comprises at step 1505 selecting the system working under CCM, and a first off time control signal S1 controls the off time period of power switch M. And under CCM, switching frequency is a constant frequency fs1. In one embodiment, the off time period controlled by the first off time control signal starts from the turning off point of power switch M to when input current decreases below a reference indicated by signal Iref, with reference to FIGS. 7 and 8.

When reference current signal Iref is less than zero, which is $2*Ith-Ipk<0$, method 1500 comprises at step 1507 selecting to work under DCM. At this time, a second off time control signal S2 controls the off time period of power switch M. At step 1508, switching frequency fs2 of power switch M during DCM is less than the frequency fs1 in CCM. In one embodiment, when power switch M transits to OFF state, capacitor C2 in FIG. 9 starts to be charged, and when the input current decreases below zero, capacitor C2 is discharged. When the voltage across capacitor C2 decreases below a reference value, power switch M is turned on, and the off time period is determined.

At step 1509, power switch M is turned on, and the on time period is controlled as $Ton=((Vout-Vin)/Vout)*Tcst$, where $Tcst=a1*C1$. And then return to step 1501 to repeat the steps.

It should be known that the logic value for logic control may be changed for achieving a same control. For example, switching control signal Vg may turn on power switch M at a high voltage level, or may also turn on power switch M at a low voltage level. And an effective state of a signal can be either in logic HIGH state, or in logic LOW state.

Some embodiments according to the present invention detect a current by sensing a current flowing through one switch to get a sensed signal during a first period, and by emulating the current according to the sensed signal during a second period.

What we claim is:

1. A Power Factor Correction (PFC) circuit comprising:
a switching circuit comprising a power switch, the switching circuit having an input terminal configured to receive an input voltage, the switching circuit further having an output terminal configured to provide an output voltage for supplying a load;
an on time control circuit configured to provide an on time control signal for controlling an on time period of the power switch;
a first off time control circuit configured to provide a first off time control signal;
a second off time control circuit configured to provide a second off time control signal; and
a logic circuit configured to selectively control the power switch working under a Continuous Conduction Mode (CCM) or a Discontinuous Conduction Mode (DCM) based on a load condition of the load, and wherein the logic circuit is configured to receive the on time control signal, the first off time control signal and the second off time control signal, and to generate a switching control signal that is coupled to the power switch; wherein
when working under CCM, the power switch is turned on in responding to the first off time control signal, and is turned off in responding to the on time control signal; and
when working under DCM, the power switch is turned on in responding to the second off time control signal, and is turned off in responding to the on time control signal.

2. The Power Factor Correction (PFC) circuit of claim 1, further comprising a third off time control circuit configured to generate a third off time control signal, wherein the logic circuit selectively controls the power switch to also work under Boundary Conduction Mode (BCM), and wherein the third off time control signal is configured to control the off time period of the power switch under BCM.

3. The Power Factor Correction (PFC) circuit of claim 1, wherein the switching frequency of the power switch under DCM is lower than the switching frequency of the power switch under CCM.

4. The Power Factor Correction (PFC) circuit of claim 1, wherein the switching circuit comprises a boost converter, and wherein the boost converter comprises the power switch.

5. The Power Factor Correction (PFC) circuit of claim 1, wherein the on time control circuit is configured to receive an input voltage detection signal indicative of the input voltage, and an output voltage feedback signal indicative of the output voltage, and wherein the on time control circuit is configured to generate the on time control signal.

6. The Power Factor Correction (PFC) circuit of claim 1, wherein the on time control circuit comprises:
a current source;
a capacitor coupled to the current source, the capacitor having a first end coupled to a reference ground and having a second end configured to provide a voltage signal;
a charging switch coupled across the capacitor, wherein when the power switch is in ON state, the charging switch is in OFF state, and the current source is configured to charge the capacitor;
a subtracting circuit having a first input coupled to an input voltage detection signal indicative of the input voltage and having a second input coupled to an output voltage feedback signal indicative of the output voltage, and having an output configured to provide a reference signal; and
a comparing circuit configured to compare the voltage signal at the second end of the capacitor with the reference signal provided by the subtracting circuit, and to generate the on time control signal.

7. The Power Factor Correction (PFC) circuit of claim 1, wherein the first off time control circuit comprises a comparing circuit, and wherein the comparing circuit has a first input configured to receive an input current detection signal indicative of an input current at the input terminal, has a second input configured to receive a reference current signal, and has an output configured to provide the first off time control signal generated by comparing the input current detection signal with the reference current signal.

8. The Power Factor Correction (PFC) circuit of claim 1, wherein the second off time control circuit comprises:
a first current source proportional to a reference current signal;
a charging switch coupled in series with the first current source;
a second current source proportional to an average current reference signal;
a discharging switch coupled in series with the second current source;
a capacitor having a first end coupled to a reference ground and having a second end configured to provide a voltage signal, wherein when an input current at the input terminal is higher than zero, the charging switch is in ON state, the first current source is configured to charge the capacitor and the voltage signal at the second end of the capacitor increases, and wherein when the input current is zero, the discharging switch is in ON state, the second current source is configured to discharge the capacitor and the voltage signal at the second end of the capacitor decreases; and
a comparing circuit having a first input configured to receive the voltage signal at the second end of the capacitor, having a second input configured to receive a threshold voltage, and having an output configured to provide the second off time control signal generated by comparing the voltage signal at the second end of the capacitor with the threshold voltage.

9. The Power Factor Correction (PFC) circuit of claim 1, wherein the logic circuit comprises:
an OR gate, having a first input, a second input and an output, wherein the first input of the OR gate is configured to receive the first off time control signal, the second input of the OR gate is configured to receive the second off time control signal;
a latch, having a set input, a reset input and an output, wherein the set input is coupled to the output of the logic circuit, the reset input is configured to receive the on time control signal and the output of the latch is configured to control the ON state and OFF state of the power switch; and
a mode selection circuit configured to receive an input current detection signal indicative of an input current at the input terminal and selectively enables the first off time control circuit or the second off time control circuit.

10. The Power Factor Correction (PFC) circuit of claim 1, further comprising:
an error amplifying circuit, having a first input, a second input and an output, wherein the first input of the error amplifying circuit is configured to receive an output voltage feedback signal indicative of the output voltage, the second input of the error amplifying circuit is configured to receive a reference voltage signal, and the output of the error amplifying circuit is configured to provide an output voltage compensation signal;
an averaging circuit having an input configured to receive an input voltage detection signal indicative of the input voltage and having an output providing an average input voltage signal indicative of the average of the input voltage detection signal; and
a multiplying circuit having a first input configured to receive the output voltage compensation signal, having a second input configured to receive the input voltage detection signal, having a third input configured to receive the average input voltage signal, and having an output configured to provide an average current reference signal.

11. The Power Factor Correction (PFC) circuit of claim 1, further comprising:
a peak current detection circuit coupled to the input terminal and configured to provide a peak current detection signal indicative of the peak current of an input current at the input terminal in each switching cycle of the power switch; and
a subtracting circuit configured to subtract the peak current detection signal from a double current reference signal and provide a reference current signal, wherein the double current reference signal is twice an average current reference signal.

12. A PFC control circuit for controlling a power switch coupled between an input terminal and an output terminal, the input terminal having an input voltage, an input current flowing into the input terminal, and the output terminal providing an output voltage, the PFC control circuit comprising:
an on time control circuit configured to provide an on time control signal;
a first off time control circuit configured to provide a first off time control signal;
a second off time control circuit configured to provide a second off time control signal; and
a logic circuit selectively controlling the power switch working under CCM or DCM; wherein
when working under CCM, the power switch is turned on in responding to the first off time control signal and is turned off in responding to the on time control signal, and when working under DCM, the power switch is turned on in responding to the second off time control signal and is turned off in responding to the on time control signal.

13. The PFC control circuit of claim 12, wherein the switching frequency of the power switch under DCM is lower than the switching frequency under CCM.

14. The PFC control circuit of claim 12, wherein the on time control circuit comprises:
a current source;
a capacitor coupled to the current source, the capacitor having a first end coupled to a reference ground and having a second end configured to provide a voltage signal;
a charging switch coupled across the capacitor, wherein the charging switch is in OFF state when the power switch is in ON state, and wherein when the charging switch is in OFF state, the current source is configured to charge the capacitor;
a subtracting circuit having a first input coupled to an input voltage detection signal indicative of the input voltage and having a second input coupled to an output voltage feedback signal indicative of the output voltage, and having an output configured to provide a reference signal; and
a comparing circuit configured to compare the voltage signal at the second end of the capacitor with the reference signal provided by the subtracting circuit, and to generate the on time control signal.

15. The PFC control circuit of claim 12, further comprising:
a peak current detection circuit coupled to the input terminal and configured to provide a peak current detection signal indicative of the peak current of the input current in each switching cycle of the power switch; and
a subtracting circuit configured to subtract the peak current detection signal from a double current reference signal and to provide a reference current signal, wherein the double current reference signal is twice the value of an average current reference signal.

16. The PFC control circuit of claim 15, further comprises:
an error amplifying circuit, having a first input, a second input and an output, wherein the first input of the error amplifying circuit is configured to receive an output voltage feedback signal indicative of the output voltage, the second input of the error amplifying circuit is configured to receive a reference voltage signal, and the output of the error amplifying circuit is configured to provide an output voltage compensation signal;
an averaging circuit having an input configured to receive an input voltage detection signal indicative of the input voltage and having an output configured to provide an average input voltage signal indicative of the average of the input voltage detection signal;
a multiplying circuit having a first input configured to receive the output voltage compensation signal, having a second input configured to receive the input voltage detection signal, having a third input configured to receive the average input voltage signal, and having an output configured to provide the double current reference signal.

17. The PFC control circuit of claim 15, wherein the first off time control circuit comprises a comparing circuit having a first input, a second input and an output, and wherein the first input of the comparing circuit is configured to receive an input current detection signal indicative of the input current, the second input of the comparing circuit is configured to receive the reference current signal and the output of the comparing circuit is configured to provide the first off time control signal, and further wherein the first off time control signal is generated by comparing the input current detection signal with the reference current signal.

18. The PFC control circuit of claim 15, wherein the second off time control circuit comprises:
a first current source proportional to the reference current signal;
a charging switch coupled in series with the first current source;
a second current source proportional to the average current reference signal;

a discharging switch coupled in series with the second current source;

a capacitor having a first end coupled to a reference ground and having a second end configured to provide a voltage signal, wherein when the input current is higher than zero, the charging switch is in ON state, the first current source is configured to charge the capacitor and the voltage signal at the second end of the capacitor increases, and wherein when the input current is zero, the discharging switch is in ON state, the second current source is configured to discharge the capacitor and the voltage signal at the second end of the capacitor decreases; and a comparing circuit having a first input, a second input and an output, wherein the first input of the comparing circuit is configured to receive the voltage signal at the second end of the capacitor, the second input of the comparing circuit is configured to receive a threshold voltage, and the output of the comparing circuit is configured to provide the second off time control signal, and wherein the second off time control signal is generated by comparing the voltage signal at the second end of the capacitor with the threshold voltage.

19. A PFC control method for controlling an input current at an input terminal following an input voltage at the input terminal, the method comprising coupling a switching circuit having a power switch to the input terminal and controlling the switching circuit working under CCM or DCM, wherein:

an on time period of the power switch is controlled by a same on time control signal under both CCM and DCM;

an off time period of the power switch under CCM is controlled by a first off time control signal, and the off time period under DCM is controlled by a second off time control signal; and a switching frequency of the power switch under DCM is lower than the switching frequency under CCM;

wherein the first off time control signal and the second off time control signal are generated regardless of a value of an inductor coupled to the power switch.

20. The PFC control method of claim 19, wherein:

when a peak current detection signal indicative of a peak value of the input current is lower than a double current reference signal indicative of twice a desired average input current, controlling the power switch working under CCM; and when the peak current detection signal is higher than the double current reference signal, controlling the power switch working under DCM.

* * * * *